United States Patent [19]

Sonobe et al.

[11] Patent Number: 4,882,303

[45] Date of Patent: Nov. 21, 1989

[54] MODIFIED STEEL SLAG AND METHOD OF MANUFACTURING THE SAME

[75] Inventors: Kozo Sonobe; Takashi Fukuzawa; Kohsuke Takeuchi; Tatushi Tabata, all of Koriyama; Hiroshi Fukuoka; Kunio Hisamatsu, both of Tokyo; Makoto Katamura, Kure, all of Japan

[73] Assignee: Nippon Chemical Industrial Co., Ltd., Japan

[21] Appl. No.: 226,628

[22] Filed: Aug. 1, 1988

[30] Foreign Application Priority Data

Aug. 4, 1987 [JP] Japan ................................ 62-193719

[51] Int. Cl.$^4$ .......................... C03C 3/089; C21B 5/04
[52] U.S. Cl. ........................................... 501/28; 65/19; 65/20; 75/30; 75/53; 75/257
[58] Field of Search ...................... 65/19, 20; 501/28; 75/30, 53, 257

[56] References Cited

U.S. PATENT DOCUMENTS 4,655,831  4/1987  Ishizaka et al. .................... 75/30 X

FOREIGN PATENT DOCUMENTS 0113640  9/1980  Japan .................................... 501/28

*Primary Examiner*—Arthur Kellogg
*Attorney, Agent, or Firm*—John W. Chestnut Tilton, Fallon, Lungmus & Chestnut

[57] ABSTRACT

A steel slag or iron slag which is a by-product generated at the time of steel or iron metallurgy and a method of manufacturing the same are disclosed. This slag is characterized in that it contains at least 0.15 wt % of boron component in the form of $B_2O_3$ and has resistance against degradation in the fused slag cooling-down process and against generation of yellowish turbid water at the time of contact of slag with rain water.

8 Claims, No Drawings

MODIFIED STEEL SLAG AND METHOD OF MANUFACTURING THE SAME

BACKGROUND OF THE INVENTION

1. Industrial Field of the Invention

This invention relates to modified steel slag or iron slag and a method of manufacturing the same, the modified steel slag being slag which is obtained by modifying furnace slag such as iron slag or steel slag, and, more particularly to modified steel slag or iron slag and a method of manufacturing the same, the steel slag being effective for preventing pulverization and generation of yellowish turbid water at the time of contact with water in iron slag or steel slag such as blast furnace slag.

2. Prior Art

A type of steel slag, particularly stainless steel slag, which has a basicity (weight ratio $CaO/Si_2$) of substantially 1.5 or more has a property whereby the $2CaO \cdot SiO_2$ phase is changed from $\alpha$-type phase to $\alpha'$-type phase, and then changed to $\gamma$-type phase or $\beta$-type phase when the slag is subjected to a cooling-down process. In many cases, when the slag changes from the $\alpha'$-type phase to the $\gamma$-type phase, a volume expansion of substantially 14% results. As is well known, this causes the slag to pulverize into fine particles and thus become dust.

This type of degradation phenomenon worsens the working environment, and disturbs further utilization of slag. These present stainless steel manufacturers with serious problems in regard to the treatment of slag.

It has for a long time been a problem for stainless steel manufacturers to find a method of preventing the degradation of slag and of solidifying it since the discharged slag can be effectively utilized as a secondary material in such applications as civil aggregates for road construction and so on.

Known methods of restricting the pulverization of slag can be exemplified as follows:

①. a method in which slag is made into water-granulated glass when the residue slag is discharged;

②. a method in which slag is modified to form a material which mainly comprises $CaO \cdot SiO_2$ and has a basicity of 1.5 or less (in practice this can be slightly varied due to the composition of the slag);

③. a method in which the phase change from $\alpha'$-type phase to $\gamma$-type which results in a great change in density is restricted and the phase change from $\alpha'$-type phase to $\beta$-type phase is activated.

However, in regard to ①, at the time of water granulation, phreatic explosion can occur due to the presence of molten metals carried at the time of discharge of the slag, and since water granulated glass is a soft material, it has insufficient strength to serve as a construction aggregate. Therefore, this method ① has not yet been put into practical use although it has been partially tested.

In regard to ② although some additives designed to modify the properties of $SiO_2$ containing material have already been placed on the market, they require the installation of supplying facilities and stirring facilities since a large quantity of $SiO_2$ needs to be employed equivalent to substantially 20% of the fused slag. Furthermore, the viscosity of slag is increased due to the drop in temperature of the fused residue following the addition, and this is not suitable from the viewpoint of workability and total cost.

The method ③, that is, bringing about a phase change from $\alpha'$-type phase to $\beta$-type phase has been studied for many years and a variety of methods have been disclosed. One of these methods, which is the most effective and assured method available at present, [see Japanese Patent Laid-Open No. 43690/1978 and the Kawatetsu Engineering Report Vol. 18, No. 1 (1986) 20 to 24 in which $Si^{4+}$ ions are replaced by $B^{3+}$ ions which have a smaller diameter than that of the $Si^{4+}$ ions contained in the slag].

However, the above-described conventional boron type of slag pulverization preventing material is in the form of small powder and dehydration/vaporization reaction occurs at the time of contact with the fused slag since the boronic slag pulverization preventing material is a water containing material. As a result of this, a blowing phenomenon of the slag pulverization preventing material is generated, causing the working environment to become excessively worsened and danger sometimes involved in the work. Therefore operation of the work is very difficult.

Furthermore, since the conventional boron type of slag pulverization preventing material significantly differs in the chemical composition and property from slag, the difference in viscosity and density from the fused slag can be easily generated, that is, a so-called affinity between the slag and the slag pulverization preventing material is not sufficient and thereby the diffusing/mixing performance is insufficient. As a result of such disadvantages, the boron type of slag pulverization preventing material cannot be put into practical use although there have been some disclosures upon it.

A second problem arises in iron slag or steel slag such as blast furnace slag that generation of a so-called "yellowish turbid water" at the time of bringing slag into contact with water such as rain or gutter water.

As is well known, gradually-cooled down slag such as blast furnace slag is widely used as various aggregates, particularly as road beds, that is a so-called "ballast". However, it has been confirmed that if the percentage of sulfur contained in slag is high, a mistake in conditions for use and manner to use it will cause yellowish turbid water and smell of hydrogen sulfide to be generated due to water or gutter water which has been brought into contact with slag. Particularly in order to secure slag quality for road construction to be free from such problem, it is standardized that slag should not generate any yellowish turbid water and smell of hydrogen sulfide. In order to evaluate this fact, a color identification test is employed, and slag should satisfy this test (JIS A 5015 made public on November 1).

A phenomenon of generation of yellowish turbid water is caused from elution of sulfur (S) contained in the form of calcium sulfide (CaS) which is contained, as a major part, in slag, and is due to generation of yellow polysulfide (such as $CaS_x$) after being applied to hydrolysis process. Known methods of preventing generation of yellowish turbid water can be exemplified as follows:

① a method in which slag is subjected to aging in which it is oxidized by water and air so that it is stabilized;

② a method in which oxidant is added to fused slag;

③ a method in which slag is treated with $CO_2$ so that the surface of the slag is stabilized; and ④ a method in which the cooling-down speed of slag is raised.

In regard to ①, aging treatment takes almost one to three months to be completed, causing a very wide space for storing to be provided.

In regard to ②, several methods can be exemplified such as a method in which high degree of ferrous oxide is added or a method in which a gas containing oxygen, such as air, is added. However, this method is not preferable since a poisonous $SO_2$ gas is generated due to the reaction. Furthermore, with this method, the generation of the yellowish turbid water cannot be sufficiently prevented.

In regard to ③, although the surface of slag can be stabilized, this method involves a disadvantage that fused sulfides can be again overflowed from a crushed surface when it is crushed at the time of changing pressure.

The method ④ is a method in which glass is prepared by degrading, diffusing and rapidly cooling down fused slag so that contained sulfur component is prevented from being oozed out. However in regard to ④, it involves deterioration in strength and its necessity of granulating to a level below a specific size to form the glass will allow it to be used as a material for small aggregates, but it is very difficult to be used as rough aggregates.

Although another method has been disclosed in which iron, manganese or zinc is, as an effective component, added so that sulfides are fixed, this method has not been put into practical use due to its high cost and insufficient effect.

Therefore, at present, the method ① in which slag is subjected to aging is only the available method to prevent generation of slag yellowish turbid water.

PROBLEMS TO BE SOLVED BY THE INVENTION

As can be clearly seen from the above description, this invention is intended to overcome a long time problem of generation of yellowish turbid water from iron and steel slag by means of an industrially low-cost and convenient slag treatment material.

Furthermore, another object of the present invention is to overcome the problem that slag is degraded due to self-decay caused from volume expansion at the time of phase changed in a cooling-down process of the above-described slag.

MEANS TO SOLVE THE PROBLEMS

A group including the inventor of the present invention therefore has studied modification of steel slag or iron slag with a material which in main contains boron, and found a fact that the glass or the sintered body of substances can significantly modify slag and thereby significantly prevent pulverization of yellowish turbid water. As a result of this, the present invention was achieved.

Namely, the present invention relates to modified steel slag or iron slag which is a by-product at the time of metallurgy of steel or iron, this slag being characterized in that it contains at least 0.15 wt% boron component in the form of $B_2O_3$ and has resistance against degradation of slag in the cooling-down process of fused slag and against generation of yellowish turbid water at the time of contact between slag and rain water.

Furthermore, this invention relates to a method of manufacturing modified steel slag or iron slag which is characterized by that heat-treated material (called heat-treated material containing boron) which contains, as the effective component, boron at least 10 wt% in the form of $B_2O_3$, and which is sintered or vitrified is added to molten steel slag which is a by-product at the time of metallurgy of steel during operation of blast furnaces, converters or furnaces for manufacturing steel

OPERATION

The modified steel slag according to the present invention needs to contain the component containing boron at least 0.15 wt% in the form of $B_2O_3$.

Furthermore, the modified steel slag according to the present invention can be manufactured by a method characterized by that a heat-treated material containing boron is added to fused steel slag.

In this case, the heat-treated material containing boron preferably contains a relatively high percentage of boron, it being contained, in many cases, about 10 wt% or more in the form of $B_2O_3$, it being contained preferably about 20 wt% or more.

As a material of the type described above, the following material which has been treated with heat are exemplified:

a material which in main contains two-component type borate such as natural or synthetic alkali borate, alkali earth metal borate, borosilicate;

a material which in main contains three-component type borosilicate such as alkali metal borosilicate, alkali earth metal borosilicate;

a material which in main contains alumino-borosilicate; and a material which in main contains four components that are boron, silicone, alkali metal and alkali earth metal.

The heat-treated material containing boron means a material which contains at least 80 wt% of the above-described main component. In this case, it contains the above-described main component at least 10 wt% in the form of $B_2O_3$, preferably, it contains 20 wt% of the same as the effective component.

Therefore, the other components are allowed to be contained at most 20 wt%, they being exemplified by materials to be involved to be mixed during the preparation of heat-treated material, materials for adjusting properties such as fusing point of glass, the softening point, the viscosity, the surface tension, or materials which can be fixed as sulfides.

Such components can be exemplified by $Na_2O$, $K_2O$, $Li_2O$, $CaO$, $MgO$, $BaO$, $SiO_2$, $Fe_2O_3$, $Al_2O_3$, $MnO_2$, $ZnO$, $P_2O_5$, $CaF_2$ or materials containing these components.

In the above-described materials, the material containing alkali metal borate as the major component, is preferable to be used, from the view point of practical use, that being represented by the following general formula: $Me_2O \cdot B_2O_3$ (wherein Me represents one or two or more types of alkali metal elements selected from Li, K and Na, and n represents the range of the number of moles between 1 and 10). That containing metallic salts of alkaline earth of borate as the major component is preferable to be used, that being represented by the following formula: $MeO \cdot nB_2O_3$ (wherein Me represents one or two or more alkali earth metal elements, n represents the range of the number of moles between 1 and 5). That containing the borosilicate is preferable to be used, that being represented by the following general formula: $SiO_2 \cdot nBnB_2O_3$ (wherein n represents the number of moles between 1 and 9). That containing borosilicate is preferably to be used, that being in the range that $B_2O_3$: from 10 to 80 wt%, $SiO_2$: from 5 to 70 wt%, $Me_2O$: from 2 to 50 wt% (however, $B_2O_3 + SiO_2 + Me_2O \geq 80$ wt%) and the others: 0 to 20 wt%. That containing alkali earth metal borosilicate is preferably to be used, that being in the rage that $B_2O_3$: from 20 to 80 wt%, $SiO$: from 10 to 60 wt%, $Me_2O$: from 5 to 40 wt% (however $B_2O_3 + SiO_2 + Me_2O \geq 80$ wt%) and the others: 0 to 20 wt%. That containing alumino-borosilicate is preferably to be used, that being in the range that $B_2O$: from 20 to 60 wt%, $SiO_2$: from 5 to 50 wt%, $Al_2O_3$: from 2 to 20 wt%, $Me_{2/n}O$: from 5 to 50 wt% (wherein Me represents alkalimetal or alkali earth metal, and n represents the valence), (however $B_2O_3 + SiO_2 + Al_2O_3 + Me_{2/n}O \geq 80$ wt%) and the others : 0 to 20 wt%. That containing a material containing boron as the major component of four component type is preferably to be used, that being in the rage that $B_2O_3$: from 20 to 60 wt%, $SiO_2$: from 10 to 50 wt%, $Me_2O$: from 3 to 20 wt%, and MeO: from 5 to 35 wt%.

The reason for the above lies in that all of the above-described materials containing boron can be easily fused and dissolved at the temperature of the fused slag since the fusing point and softening point of them are in the range of about 1100° C. or less, preferably in the range of 700 to 1050C. so that the necessity for the material which has been treated with heat and which contains boron to be quickly dissolved and diffused in the fused slag can be satisfied due to its composition.

The heat-treated material containing boron means here that a material which is obtained by sintering or vitrifying a material which contains boron as the major component so as to be substantially dehydrated. Therefore, sintered materials, vitrified materials and their mixtures can be included in the heat-treated material containing boron, and vitrified materials are particularly preferable for use in the present invention. The vitrification means here that materials are made amorphous to the degree at which it cannot be clearly defined with a specific strength of analyzing rays when X-ray analysis is conducted.

The heat-treated material containing boron according to the present invention is crushed for use, however, this needs to be a material which has been roughly crushed.

Therefore, in many cases, the particle size distribution ranged from from 0.1 mm or larger to a mass whose size is equivalent to the fist or cullets can be used, and more particularly, preferable one being that in which the particle distribution of 0.1 to 50 mm shares 90 % or more.

The reason why the roughly crushed treatment material according to the present invention is required lies in that if the particle size is 0.1 mm or smaller, however depending upon the state how it is added to fused slag, condensation phenomenon occurs between fine particles, causing the material to be prevented from being smoothly fused in fused slag. Furthermore, sometimes non-dissolved mass will be generated, or dust phenomenon will occur at the time of addition in the furnace.

On the other hand, if the size of the roughly crushed treatment material is too large, although effect in uniformly-improving properties of slag can be preferably obtained due to stirring effect caused by addition of it to fused slag, however, if the mass exceeding, in size, a fist or cullet will generate non-fused portions.

Therefore, a material for aid can be, if necessary, mixed with the above-described slag treatment material in order to improve in effects of quickly dissolving, diffusing and mixing with fused slag after the slag treatment material has been added.

Such a material for aid is powder in which dehydrating and/or decarbonizing reaction is generated due to heat applied. Powder of the type described above can be exemplified by one or two or more materials selected from: aluminosilicate such as clay, activated clay, diatomaceous earth; other aluminosilicate such as bentonite, perlite and zeolite; carbonate or bicarbonate such as sodium, potassium, calcium, magnesium or barium carbonate, borate such as Borax, kernite, ulexite, colemanite.

The amount of addition of the above-described material for aid cannot be uniformly mentioned upon types, a method of adding pulverization preventing material, the properties and the state of fused slag. It may be up to 30 wt% with respect to the pulverization preventing material, and is preferably be in the range from 5 to 15 wt%.

The particle size of this material for aid is preferably be smaller than that of the pulverization preventing material, and its means particle size is preferably be smaller than the lower limit of the pulverization preventing material.

The slag treatment material according to the present invention can be prepared by mixing a material which contains, as the effective component, boron, and heating the thus-mixed material so as to sinter or fuse, and then cooling down and crushing the same.

The boronic starting material can be exemplified by a chemically converted material such as boronic acid, sodium borate, mineral borate such as colemanite ($Ca_2B_6O_{11}.5H_2O$), ulexite ($NaCaB_5O_9 . 8H_2O$), tincal ($Na_2B_4O_7.10H_2O$), and kernite ($Na_2B_4O_7.4H_2O$). The alkaline material can be exemplified by caustic alkali, alkali carbonate and alkali bicarbonate and so on. The alkali earth metallic material can be exemplified by carbonate, hydroxide, and oxide of alkali earth metal. The silicon material can be exemplified by silica sand, quartz sand, diatom, synthetic silica, slag and clay and the like. Other materials can be exemplified by $Fe_2O_3$, $Al_2O_3$, $MnO_2$, $P_2O_5$, fluoride, or a material containing these materials.

The above-described starting materials are properly selected, mixed to become the above-described ratio, and supplied to a required fusing furnace or a calcining furnace so as to be heated/fused or calcined. Next, the thus heat-treated material is subjected to adjustment of particle size after it has been cooled down whereby a desired product can be obtained.

There is no reason for limiting the heating conditions, however, it needs for temperature to be at which the water of crystallization or adhered water can be, of course, substantially dehydrated, at which the particles of the material are calcined each other, and at which they can be fused. Since this temperature differs in accordance with the composition of the material, it may be determined so as to correspond to the specific heat treatment apparatus.

When vitrification is conducted, the most practical method of cooling down the fused liquid is that with tapping the fused liquid, pressure water is applied to crush so as to recover it in the form of sand-shaped glass. Another method can be exemplified by a method in which the fused liquid to be tapped is placed on a belt conveyer so as to be cooled down by water or air so that it is recovered in the form of a cullet.

Next, the particle size is adjusted after conducting drying so as to remove adhered water. However, in case of water-crushed material, particle size adjustment by crushing and screening is not necessarily be needed. Since the material merely dried can per se made a product. Therefore, the particle size adjustment is needed to be conducted if necessary. The sintered material is subjected to particle size adjustment with a provided crasher.

In this case, the above-described material for aid can be mixed if desired.

Slag subjected to the present invention is a type which in main contains basic type calcium silicate which is pulverized to fine particles at the time of cooling down or being subjected to aging, or a type which generates yellowish turbid water when it is brought into contact with water. It generally having basicity (weight ratio $CaO/SiO_2$) is at least 1.3, it being preferably within the range between 1.5 and 3.5. It can be exemplified by blast furnace slag, steel slag such as stainless steel, or converter slag.

The amount of slag treatment material to be added with respect to the amount of slag is not uniform in accordance with the composition, properties and the composition of slag or the like. It is needed to be at least about 0.15 wt% in the form of $B_2O_3$ for the purpose of either preventing pulverization of slag or preventing generation of yellowish turbid water, it being preferably be 0.3 wt% or more from the viewpoint of durability of property-improved slag.

The reason for this lies in that; if it is less than about 0.15 wt%, it is not sufficient to prevent generation of yellowish turbid water and occurrence of degradation. Oh the other hand, there is no reason to determine the upper limit. In many cases, it is naturally limited from the viewpoint of economy or affection to molten metal. Therefore, the preferable range from the viewpoint of practical use is from 0.3 wt% to 1.5 wt%.

Slag can be improved in properties by using the slag treatment material according to the present invention without any particular change in the operating conditions in the conventional blast furnaces and steel furnace, and by adding the slag treatment material to fused slag in presence or non-presence of fused metal. It can be understood that it will cause great advantages.

Therefore, when fused slag is delivered from a blast furnace through gutters during which a supplying port being disposed at the desired position through which the slag treatment material is added, the slag treatment material is added at the time of delivery by means of a delivery wheel or the like from a dam disposed in the gutter, or the same is added at the time of delivery together with fused slag.

In a case of manufacturing stainless steel or the like, the slag treatment materials is added, similar to the above description, when the stainless steel is tapped from an electric fusing furnace to a ladle or when fused slag is removed into a slag pot.

In this case, manner of adding the slag treatment material to fused slag is not particularly limited only satisfying the necessity of the slag treatment material should be quickly dissolved and diffused into slag.

For example, a manner can be employed in which the slag treatment material is per se added to fused slag in presence or no presence of hot metal, another method can be employed in which the same is added under air pressure, and other method can be employed in which the same is supplied and added with the same wrapped as it is, and the other method can be employed the slag water is supplied to the state in which the slag treatment material has been previously present.

If the slag treatment material is added to the state in presence of hot metal, the degree of affection such as mixture of boron into the hot metal can be substantially neglectable. This leads a fact that an advantage in application of the slag treatment material according to the present invention.

Therefore, the slag treatment material is only added at the time of discharging to a slag port when the above-described affection can be expected. In the other cases, it is practical to add it to slag in presence of hot metal which has been maintained at high temperature since the viscosity of slag fused liquid is relatively smaller, causing the dissolving and diffusion of the slag treatment material can be conducted quickly, as a result of this, the improvement in properties of slag can be uniformly conducted.

If dissolving and diffusion of the slag treatment material can be insufficiently conducted due to viscosity of slag fused liquid being raised at the time of addition of the same to a slag pot, the above-described material for aid can be, if necessary, added for the purpose of assisting the re-heating or diffusion of slag.

Therefore, it is substantially needless to provided any diffusion means for the purpose of quick dissolving and diffusion after the slag treatment material has been added to fused slag.

As a result of this, slag whose properties have been improved can be obtained by gradually or rapidly cooling down in a normal way after the above-described addition has been conducted.

The effect obtained from the modified steel slag according to the present invention exceeds out expectations such as that the characteristics are changed in such a manner that yellowish turbid water is not substantially generated at the contact with water and furthermore, slag is modified to slag having resistance against the degradation involved at the time of the phase change of slag of this type.

Therefore, modified slag of the type described above can be effectively used as ballasts and artificial stones and can be used as a variety of materials for civil engineering.

The fine particles obtained by crushing of the modified slag according to the present invention exhibits hydraulicity, although it being not uniform upon the composition of slag, so that it can be used as cement having fire resistance.

DESCRIPTION OF THE PREFERRED EMBODIMENTS

Embodiments according to the present invention will now be described.

Example 1

A slag treatment material (No.1) (water crashed material) in the form of sand-shaped glass powder containing boron and having the particle size of $-5$ mm and having the chemical composition shown in Table 1 is added to the fused slag obtained at the time of tapping from an electric furnace, the slag treatment material being added, in the form contained in 10kg-vinyl bag, at the time of removing slag from a ladle to a slag pot in the ratio of addition shown in Table 2.

TABLE 1

| B₂O₃ | CaO | SiO₂ | Al₂O₃ | MgO | Na₂O |
|---|---|---|---|---|---|
| 30.4 | 29.3 | 26.1 | 2.4 | 1.5 | 8.3 |

(weight %)

Slag subjected to this process was stood and cooled down in a normal manner and was adjusted in its particle size to become equivalent to MS-25 so that ballast was obtained.

The presence of yellowish turbid water in ballast is measured in accordance with the following evaluation method. The results of the measurement and the chemical composition (weight %) are shown in Table 2.

TABLE 2

| Test No. | | 1 | 2 | 3 | 4 | 5 |
|---|---|---|---|---|---|---|
| Amount of slag (t/ch) | | 2.8 | 3.0 | 3.0 | 2.9 | 3.3 |
| Amount of addition (kg/ch) | | — | 10 | 20 | 30 | 60 |
| Rate of wt % addition | | 0 | 0.33 | 0.67 | 1.03 | 1.82 |
| Conversion by B₂O₃ | | 0 | 0.10 | 0.20 | 0.31 | 0.55 |
| Chemical composition of slag (wt %) | CaO | 27.1 | 24.7 | 27.8 | 28.0 | 25.6 |
| | SiO₂ | 20.6 | 20.0 | 20.6 | 21.4 | 20.3 |
| | MgO | 15.6 | 11.0 | 16.8 | 15.4 | 19.7 |
| | Al₂O₃ | 28.5 | 34.8 | 25.7 | 25.4 | 26.1 |
| | MnO | 1.2 | 1.6 | 1.1 | 0.8 | 1.3 |
| | TiO₂ | 0.7 | 0.8 | 0.5 | 0.5 | 0.6 |
| | FeO | 2.2 | 0.9 | 2.6 | 1.1 | 2.3 |
| | S | 1.98 | 2.08 | 2.39 | 2.73 | 2.04 |
| | P | 0.005 | 0.005 | 0.005 | 0.005 | 0.005 |
| Color Indentification Test (yellow index) | | 5.0 | 0.5 | 0 | 0 | 0 |
| Remarks | | Cont. | Comp. | E | E | E |

(Cont: Contrast example, Comp: Comparison example, E: Example)

Method of evaluating yellowish turbid water

The thus-obtained 500g of sample ballast is weighed, is placed in 1500 ml of pure water, and is boiled for 45 minutes in accordance with color identification test per JIS A5015. The filtered eluate is taken in a color comparing tube so as to be visually tested with reference to color reference liquid upon the presence of color. In order to numerize the degree of darkness or lightness of the color of the eluate, that is the degree of the hue of the eluate, the absorbance of the reference liquid and the eluate are measured with an absorbance meter. The results were evaluated with the thus-obtained yellow index as shown in Table 3.

TABLE 3

| Hue | Yellow Index | Absorbance (−log T) | Density of potassium bichromate reference liquid (g/l) |
|---|---|---|---|
| colorless | 0 | 0.022 or less | 0.002 or less |
| almost colorless | 0.5 | 0.022 to 0.064 | 0.002 to 0.006 |
| extremely light yellow | 1.0 | 0.064 to 0.113 | 0.006 to 0.011 |
| very light yellow | 1.5 | 0.113 to 0.181 | 0.011 to 0.018 |
| slightly light yellow | 2.0 | 0.181 to 0.30 | 0.018 to 0.032 |
| Light yellow | 2.5 | 0.30 to 0.46 | 0.032 to 0.052 |
| Yellow | 3.0 | 0.46 to 0.80 | 0.052 to 0.10 |
| Slightly dark yellow | 3.5 | 0.80 to 1.02 | 0.10 to 0.17 |
| dark yellow | 4.0 | 1.02 to 1.09 | 0.17 to 0.30 |
| very dark | 4.5 | 1.09 to 1.16 | 0.30 to 0.45 |
| yellow brown | 5.0 | 1.16 or more | 0.45 or more |

As can be clearly seen from the Table 2, the eluent amount of sulfur is reduced due to addition of the slag treatment material, and the yellow index became 0 in this Example in which 0.20 wt%, which is the amount converted to B₂O₃, is added, as a result of this yellowish turbid water was prevented from being generated.

Example 2

The slag treatment material similar to that according to the Example 1 was added by 3 kg, 5 kg and 7 kg with respect to a ton of fused slag to fused blast furnace slag flowed from a blast furnace.

This slag treatment material was added at certain intervals in the form enclosed in each 10kg vinyl bag at the time of dropping of slag from an inclined gutter to a slag vehicle through a slag gutter in a casting bed disposed in front of the furnace.

This addition work is not limited to the description above, the slag treatment material may be previously enclosed in the slag vehicle or it may be directly added to the flow of fused slag passing through the slag gutter by using a device for cutting the constant quantity of slag.

The slag which has been subjected to the addition process is conveyed to a field for slag so that it is subjected to a normal field-process in which it is cooled down, and is divided into powder and the particle size was adjusted. As a result of this, ballast of MS-25 was obtained.

A sample was obtained from each ballast and yellow index was obtained in a manner similar to that shown in Table 2 according to the Example 1. The results shown in Table 4 was obtained.

For the sake of comparison convenience, the results of a contrast example in which the slag treatment was not used are also shown on the Table 4. In comparison to this contrast example and comparison example, it can be clearly understood that the effect of the present invention is significant.

TABLE 4

| Test No. | 1 | 2 | 3 | 4 |
|---|---|---|---|---|
| Amount of slag (t/pan) | 35 | 35 | 35 | 35 |
| Amount added (kg/pan) | 0 | 110 | 180 | 250 |
| % Rate of addition | 0 | 0.31 | 0.51 | 0.71 |
| Amount converted to B₂O₃ | 0 | 0.10 | 0.16 | 0.22 |
| Color identification test (Yellow index) | 4.5 | 1.5 | 0 | 0 |
| Remarks | Cont. | Comp. | Ex. | Ex. |

Meanwhile, it cannot be said that the present invention is achieved successfully if yellowish turbid water is again generated from the blast furnace ballast due to the storing or aging or characteristics for uses as roadbeds are excessively deteriorated in a case where slag treatment material is added to fused steel slag for the purpose of preventing generation of yellowish turbid water and so on.

Therefore, the relationship between the yellow index and the unconfined compression strength of the characteristics for use as roadbeds and aging is examined in accordance with JIS A 5015 with ballast shown in Table 4 used. The results are shown in Table 5.

TABLE 5

| Rate of addition of treatment Material (%) | Aging time period | Color Indentification test (Yellow index) | Unconfined compresion strength (kg/cm$^2$) (standing for 13 days, dipping in water for 1 day) |
|---|---|---|---|
| No addition Contrast Example | 0 | 4.5 | 17.6 |
| | 1 month | 3.0 | 14.3 |
| | 2 months | 1.5 | 14.7 |
| | 3 months | 0 | 13.2 |
| 0.31 Comparison Example | 0 | 1.5 | 20.0 |
| | 1 month | 0.5 | 19.3 |
| | 2 months | 0 | 18.6 |
| | 3 months | 0 | 16.9 |
| 0.51 Embodiment | 0 | 0 | 18.7 |
| | 1 month | 0 | 18.0 |
| | 2 months | 0 | 18.2 |
| | 3 months | 0 | 17.1 |
| 0.71 Embodiment | 0 | 0 | 19.4 |
| | 1 month | 0 | 18.6 |
| | 2 months | 0 | 17.8 |
| | 3 months | 0 | 17.3 |

As can be clearly seen from the Table 5, in comparison to the contrast example and the comparison example, this invention showed excellent result in such a manner that the yellow index showed no problem without any necessity of aging and unconfined compression strength also showed moderate deterioration with respect to the contrast example.

Example 3

The presence of yellowish turbid water was measured in modified slag manufactured by adding, to fused slag, slag treatment materials which comprise 2-component type heattreated material containing boron whose compositions are shown in Table 6.

| Slag treatment material No. | Composition | Remarks |
|---|---|---|
| 2 | $Na_2O.4B_2O_3$ | sandy glass powder |
| 3 | $CaO.4B_2O_3$ | sandy glass powder |
| 4 | $SiO_2.7B_2O_3$ | cullet |
| 5 | $SiO_2.7B_2O_3$ | sintered powder |

That is, the above-described slag treatment materials were respectively added to fused slag at the time of tapping from electric furnace for steel by a predetermined quantity (0.3 to 0.4 wt%) in the form of $B_2O_3$ in such a manner, similar to the Example 1, that it is enclosed in a poly-bag at the time when slag is removed from ladle to a slag pot. Slag subjected to this modifying process was subjected to a normal standing/cooling process and the particle size of the same is adjusted to meet MS-25 for the purpose of making it ballast.

The generation of yellowish turbid water from the thus-obtained ballast is measured with an evaluating method similar to the Example 1. The result is that any ballast obtained by using each slag treatment material was modified to ballast having the yellow index less than 0.5. On the other hand, the ballast to which no slag treatment material added showed yellow index of 5. The outline of the chemical composition of the modified ballast was as shown in the following table.

TABLE 7

| (weight %) | | | | |
|---|---|---|---|---|
| $B_2O_3$ | CaO | $SiO_2$ | MgO | $Al_2O_3$ |
| 0.32 to 0.50 | 24 to 20 | 20 to 21 | 11 to 20 | 25 to 35 |

Example 4

Modified slag was manufactured, similarly to the Example 1, by using a multicomponent type of heat-treated material containing boron whose composition is shown in Table 8.

TABLE 8

| Slag treatment material | $B_2O_3$ | $Na_2O$ | CaO | BaO | $SiO_2$ | $Al_2O_3$ | F |
|---|---|---|---|---|---|---|---|
| No. 6 | 63 | 28 | | | 9 | | |
| 7 | 59 | 15 | 27 | | 10 | | 2 |
| 8 | 55 | 3 | | 35 | 10 | | 2 |
| 9 | 36 | 10 | | | 39 | 10 | |
| 10 | 45 | 2 | | 15 | 35 | 5 | 2 |

Note: No. 1 is a sintered material of 0.1 to 5 mm, Nos.2 to 5 are glass crushed materials, No. 2 is cullet, andothers are sandy glass powder That is, the above-described slag treatment materials were respectively added to fused slag at the time of tapping from electric furnace for manufacturing steel by a predetermined quantity (0.3 to 0.5 wt% in the form of $B_2O_3$ in such a manner, similar to the embodiment 1, that it is enclosed in a poly-bag at the time when slag is removed from ladle to a slag pot. Slag subjected to this modifying process was subjected to a normal standing-/cooling process and the particle size of the same is adjusted to meet MS-25for the purpose of making it ballast.

The generation of yellowish turbid water from the thus-obtained ballast is measured with an evaluating method similar to the Example 1. The result is that any ballast obtained by using each slag treatment material was modified to ballast having the yellow index less than 0.5. On the other hand, the ballast to which no slag treatment material added showed yellow index of 5. The outline of the chemical composition of the modified ballast was as shown in the Table 7.

Example 5 (slag pulverization resistance test)

When stainless steel slag having basicity (CaO/SiO$_2$=2.10) which is the first slag tapped from an electric furnace for manufacturing stainless steel (capacity: 30 tons) is removed from a ladle to a slag spot, each poly vinyl bag accommodating 10kg of the test sample of each slag treatment material which is used in the embodiments 1 to 4 is supplied up to 30kg simultaneously. Next, the thus-supplied slag was allowed to stand at low temperature to make it solid. The process until the temperature reaches room temperature was observed.

The test conditions are as follows:

TABLE 9

| Test No. | Sample No. | Amount of tapping (t) | Amount of sample added (kg/t slag) | $B_2O_3$ contained in slag (wt %) | Temperature at tapping (°C.) |
|---|---|---|---|---|---|
| 1 | 1 | 2.40 | 12.51 | 0.38 | 1440 |
| 2 | 2 | 5.20 | 5.76 | 0.47 | 1420 |
| 3 | 3 | 4.95 | 6.06 | 0.50 | 1420 |
| 4 | 4 | 5.22 | 5.75 | 0.51 | 1400 |
| 5 | 5 | 5.22 | 5.75 | 0.51 | 1430 |

TABLE 9-continued

| Test No. | Sample No. | Amount of tapping (t) | Amount of sample added (kg/t slag) | $B_2O_3$ contained in slag (wt %) | Temperature at tapping (°C.) |
| --- | --- | --- | --- | --- | --- |
| 6 | 6 | 3.99 | 7.52 | 0.47 | 1420 |
| 7 | 7 | 3.69 | 8.14 | 0.48 | 1440 |
| 8 | 8 | 3.27 | 9.17 | 0.50 | 1440 |
| 9 | 9 | 2.09 | 14.37 | 0.51 | 1430 |
| 10 | 10 | 2.90 | 10.33 | 0.46 | 1410 |
| 11 | — | 4.12 | 0 | 0 | 1431 |
| 12 | — | 4.07 | 0 | 0 | 1406 |
| 13 | — | 3.99 | 0 | 0 | 1413 |

At the time of addition of each test sample, all of the tests did not show any generations of dust and gases, and the addition work could be conducted safely. An excellent diffusion and mixture could be obtained at the time of supplying slag to the slag pot.

After allowing to stand each slag after the test, the state of the slag was observed. Slag with test Nos. 1 to 10 did not show any decay and degradation.

On the other hand, conventional slag with the test Nos. 11 to 13 to which no slag treatment material was added was decayed and degraded when it was cooled down.

The outline of the analyzed value (weight %) of slag used in the test is as follows:

| Test No. | Cao | $SiO_2$ | MgO | $Al_2O_3$ |
| --- | --- | --- | --- | --- |
| 1 to 13 | 48 to 55 | 22 to 28 | 9 to 13 | 9 to 15 |

In each test, no dust generation was observed due to supply of test sample, and the test sample was instantaneously splashed and flowed on fused slag. The state was observed after slag has been allowed to stand until room temperature. No decay and degradation phenomenon were not observed. It was found that excellent effect can be obtained by using 0.38 to 0.50 wt% of $B_2O_3$.

Effect of the Invention

The modified steel slag according to the present invention is a steel slag which can substantially prevents generations of gradation phenomenon and yellowish turbid water which have been a problem for a long time for steel manufacturing industrial field.

Therefore, the modified slag can be advantageously applied to ballasts or artificial stones used for a variety of civil engineering materials.

Furthermore, fine powder of the modified slag can be effectively used as an advantageous cement material due to its hydraulicity and fire resistance.

What is claimed is:

1. A modified steel slag or iron slag comprising slag which is a by-product at the time of steel or iron metallurgy, said slag containing from 0.3 to 1.5 wt% boron component in the form of $B_2O_3$ and having resistance against degradation in a cooling-down process for fused slag and against generation of yellowish turbid water at the time of contact of said slag with rain water.

2. A modified steel slag or iron slag according to claim 1, wherein said slag is any of blast furnace slag, converter slag or steel furnace slag.

3. A modified steel slag or iron slag according to claim 1 or 2, wherein said slag has the basicity CaO/$SiO_2$ (weight ratio) ranged between 1.5 and 3.5.

4. A method of manufacturing modified steel slag or iron slag comprising adding at least 10 wt% of a heat-treated material containing boron in the form of sintered or vitrified $B_2O_3$ to fused slag which is a by-product created at the time of steel or iron metallurgy during operation of blast furnaces, converters or steel furnaces, and then cooling said slag.

5. A method of manufacturing modified steel slag according to claim 4, wherein said heat-treated material containing boron is added in the form of $B_2O_3$ of from 0.15 to 1.5 wt% to said fused slag.

6. A method of manufacturing modified steel slag according to claim 4 or 5, wherein said heat-treated material containing boron is added to said fused slag at the time of tapping or removing fused steel slag.

7. A method of manufacturing modified steel slag according to claim 4 or 5, wherein said heat-treated material containing boron has the softening point or fusing point of 1100° C. at the highest.

8. A method of manufacturing modified steel slag according to claim 4 or 5, wherein said heat-treated material containing boron is a rough particle vitrifying material which crushed into the size of 0.1 mm to cullet the size of which is equivalent to the fist.

* * * * *

UNITED STATES PATENT AND TRADEMARK OFFICE
CERTIFICATE OF CORRECTION

PATENT NO. : 4,882,303

DATED : November 21, 1989

INVENTOR(S) : Kozo Sonobe et al

It is certified that error appears in the above-identified patent and that said Letters Patent is hereby corrected as shown below:

Column 14, line 45, after "which" add the word --is--

Signed and Sealed this

Twenty-sixth Day of March, 1991

Attest:

HARRY F. MANBECK, JR.

*Attesting Officer*     *Commissioner of Patents and Trademarks*